Jan. 1, 1935.  W. M. BELL  1,986,618

WELDING WIRE

Filed May 5, 1933

INVENTOR
William M. Bell
by his attorneys

Patented Jan. 1, 1935

1,986,618

UNITED STATES PATENT OFFICE 1,986,618

WELDING WIRE

William M. Bell, Portsmouth, Ohio, assignor to Wheeling Steel Corporation, Wheeling, W. Va., a corporation of Delaware Application May 5, 1933, Serial No. 669,540

6 Claims. (Cl. 219—8)

This invention relates to welding wire, and has for one of its objects to provide a welding wire suitable for autogenous welding, which is provided with means for the reception of flux and which has particular advantages in the welding operation.

In autogenous welding a wire is fed to the weld and is there fused or melted to form the union between the parts being welded together. In order that the proper union may be formed a flux is also applied with the welding wire to form a slag as well known in the art. Various methods of applying the flux have been proposed, one of such methods being to form in the welding wire grooves or indentations for receiving the flux so that the flux will thus automatically be fed with the wire to the weld in such manner as to perform its function. This method is quite satisfactory solely from the standpoint of supplying the flux to the weld but has been found unsatisfactory for the reason that the grooves or indentations formed in the wire have resulted in material variations in the cross section of the wire which, in turn, deleteriously affects the welding operation. It has been practically demonstrated that a welding wire of substantially uniform cross-sectional area welds with a quiescent arc condition, stable in its action, producing a smooth and uniform weld pleasing in appearance, whereas wire of varying cross-sectional area causes continuous voltage fluctuations, affecting the temperature of the arc at the weld, creating an erratic and unstable arc condition, and consequently producing a rough and irregular weld.

I provide a welding wire having indentations or groove means for the reception of flux so arranged that the cross-sectional area of the welding wire remains sufficiently nearly constant to avoid material irregularity in welding. I so arrange the groove means or indentations that as the wire is fed to the weld and is consumed the cross-sectional area of the wire, authough it may change slightly, does not change sufficiently to produce the deleterious effects above referred to.

Other details, objects and advantages of the invention will become apparent as the following description of certain present preferred embodiments thereof proceeds.

In the accompanying drawing I have shown certain present preferred embodiments of the invention, wherein Figure 1 is a view of a section of welding wire;

Figure 1:

Referring more particularly to Figure 1, there is provided a welding wire 2 which comprises an elongated metal body 3 of any desired cross-section and which is shown as being round. Grooves or indentations 4 are formed in the elongated metal body 3, such grooves or indentations being for the purpose of receiving flux. The flux receiving means are preferably so arranged that the cross-sectional area of the welding wire remains sufficiently nearly constant to avoid material irregularity in welding. In Figure 1 the grooves are shown as being arranged in generally spiral formation, that is to say, progressively along an imaginary spiral, indicated for purposes of explanation by the dotted line 5, the grooves extending or being elongated in the direction of the spiral.

Figure 2:
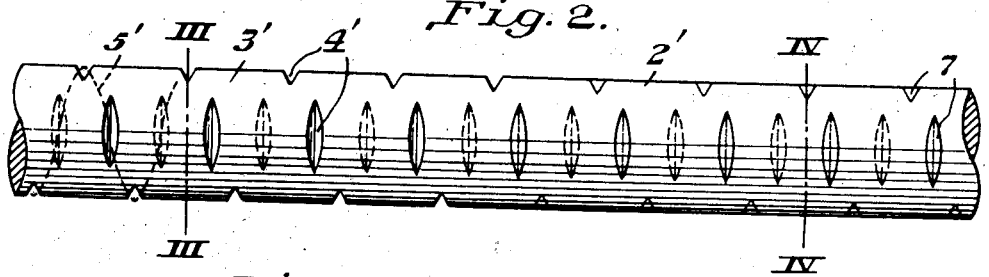
Figure 2 is a view similar to Figure 1 showing a modified construction.

In Figure 2 parts corresponding to the above described parts of Figure 1 are designated by corresponding numerals having a prime affixed. The grooves 4' in Figure 2 are likewise arranged along an imaginary spiral 5', but instead of extending in the direction of the spiral they extend generally in planes perpendicular to the axis of the wire.

Figure 3:
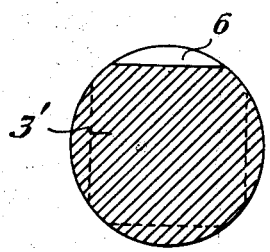
Figure 3 is a transverse cross-sectional view taken on the line III—III of Figure 2.

In the constructions of both Figures 1 and 2 the grooves are arranged in a direction non-parallel to the axis of the wire and in regular formation throughout the length of the wire. They are spaced apart both axially and circumferentially of the wire and are arranged in generally longitudinally extending rows with the indentations of the respective rows staggered relatively to one another. Such arrangements provide particularly well for receiving and holding the flux in desired amounts and feeding the flux to the weld as it is required. Due to the number and arrangement of the grooves they are not unduly deep and they are so arranged that the areas of successive cross-sections taken through the welding wire are not materially different. Throughout the major portion of the length of the wire a cross-section taken at right angles to its axis will pass through one, and only one, of the grooves or indentations so that the maximum variation is the area of one of the grooves, as indicated at 6 in Figure 3. The grooves may be arranged to reduce even this variation by slightly overlapping them in the longitudinal direction, although due to the fact that the variation is so small the overlapping is unnecessary for most purposes. In actual use the wire is seldom consumed in such manner that the end at the weld forms a smooth face perpendicular to the axis of the wire so that the slight variation in area is not felt.

The arrangement of the grooves generally in the transverse direction, as shown in Figures 1 and 2, also has the advantage that as the wire is fed to the weld the flux is held in place more effectively than if the grooves extended generally longitudinally, when there would be a tendency for the flux to run out. The provision of the groove means as comprising separate grooves, as shown in the drawing, is also of advantage in this same connection as there is a tendency in the use of a generally longitudinally extending continuous groove, such as a spiral groove, for the flux to melt some distance back from the weld and run down to the weld unevenly. This tendency is counteracted by providing separate independent grooves instead of a long continuous groove.

Figure 4:
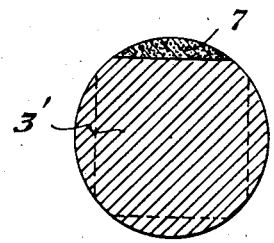
Figure 4 is a transverse cross-sectional view similar to Figure 3 taken on the line IV—IV of Figure 2 showing the application of flux.

In both Figures 1 and 2 the wire is shown at the left-hand portion as not having flux applied in the grooves and at the right-hand portion as having flux applied and smoothed off at the surface of the wire. The flux is shown in cross-section at 7 in Figure 4.

The welding wire is adapted for both hand and machine welding, and the formation and arrangement of the grooves as above described is of particular advantage when the wire is used for machine welding as the grooves protect the flux from the feed rolls.

While I have shown and described certain present preferred embodiments of the invention, it is to be distinctly understood that the same is not limited thereto, but may be otherwise variously embodied within the scope of the following claims.

I claim:

1. Welding wire comprising an elongated metal body having a plurality of generally transversely extending generally radially depressed grooves formed in its surface for the reception of flux, said grooves being so arranged that the cross-sectional area of the welding wire remains sufficiently nearly constant to avoid material irregularity in welding, each groove being longitudinally offset from each other groove.

2. Welding wire comprising an elongated metal body having generally radially depressed indentations in its surface for the reception of flux, adjacent indentations being throughout the wire spaced apart both axially and circumferentially of the wire and being so arranged that the cross-sectional area of the welding wire remains sufficiently nearly constant to avoid material irregularity in welding, each indentation being longitudinally offset from each other indentation.

3. Welding wire comprising an elongated metal body having generally transversely extending indentations in its surface for the reception of flux, such indentations being arranged in generally longitudinally extending rows with the indentations of the respective rows staggered relatively to one another, each indentation being longitudinally offset from each other indentation.

4. Welding wire comprising an elongated metal body having indentations in its surface for the reception of flux, such indentations being arranged in generally spiral formation, the axes of said indentations extending substantially in the direction of the spiral.

5. Welding wire comprising an elongated metal body having indentations in its surface for the reception of flux, such indentations being elongated generally in planes perpendicular to the axis of the wire and being arranged generally longitudinally of the wire so that the cross-sectional area of the welding wire remains sufficiently nearly constant to avoid material irregularity in welding, each indentation being longitudinally offset from each other indentation.

6. Welding wire comprising an elongated metal body having indentations in its surface for the reception of flux, such indentations being arranged in the form of a single spiral.

WILLIAM M. BELL.